Figure 1:
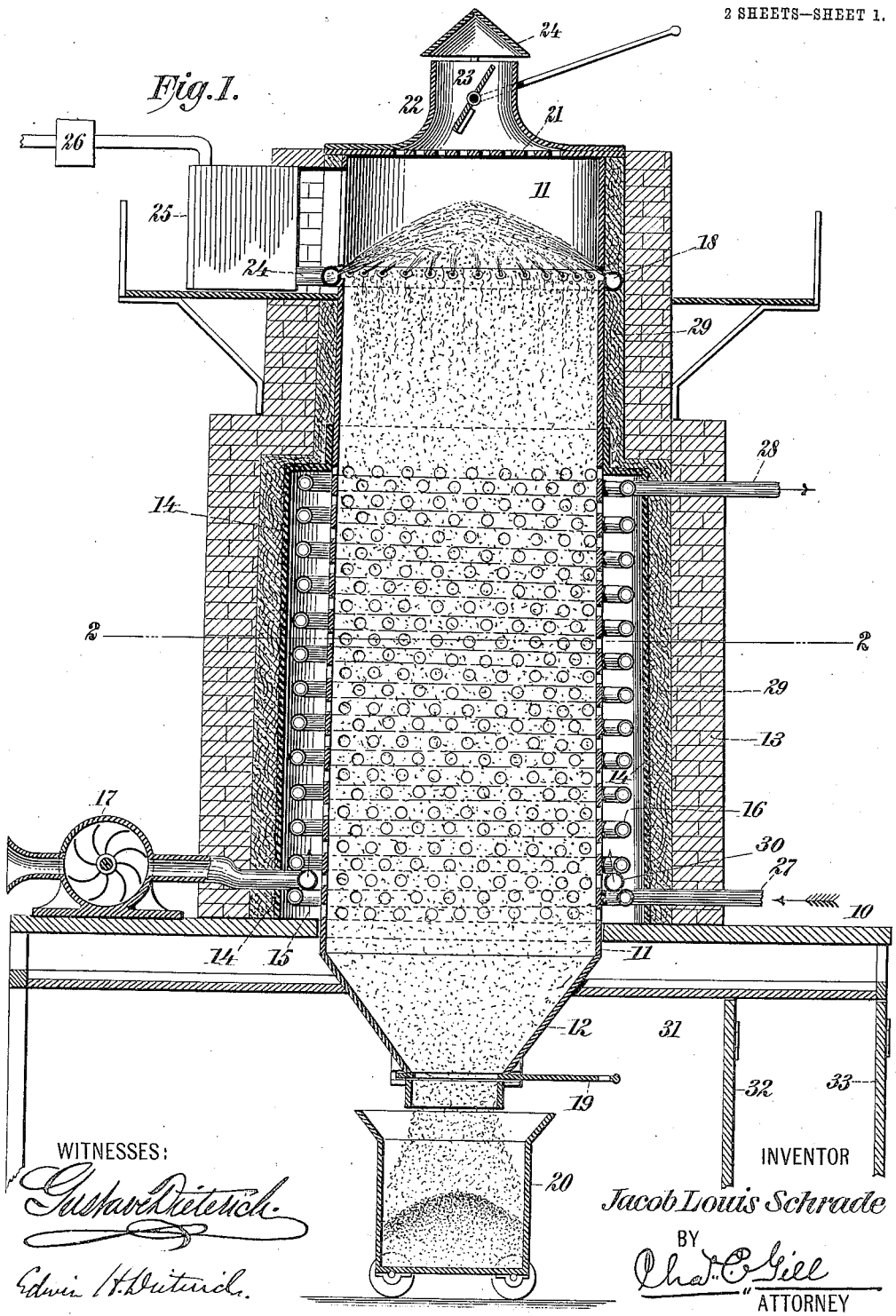

J. L. SCHRADE.
APPARATUS FOR THE EVAPORATING OF LIQUIDS.
APPLICATION FILED APR. 8, 1904.

Patented Jan. 12, 1909.

INVENTOR
Jacob Louis Schrade
BY
ATTORNEY

WITNESSES:

UNITED STATES PATENT OFFICE.

JACOB LOUIS SCHRADE, OF NEW YORK, N. Y.

APPARATUS FOR THE EVAPORATING OF LIQUIDS.

No. 909,460.     Specification of Letters Patent.     Patented Jan. 12, 1909.

Application filed April 8, 1904. Serial No. 202,185.

*To all whom it may concern:*

Be it known that I, JACOB LOUIS SCHRADE, a citizen of the United States, and a resident of New York, in the county of New York and State of New York, have invented certain new and useful Improvements in Apparatus for the Evaporating of Liquids, of which the following is a specification.

The invention relates to improvements in apparatus for the evaporating of liquids containing solids, and consists in the novel art and structure hereinafter described and particularly pointed out in the claim.

The invention is not limited to the evaporation of any special liquid but I present the same herein as employed in the evaporation of milk for the production of milk powder.

In carrying out my invention I cause the liquid or solution which is to be evaporated to be delivered continuously in the form of upwardly and inwardly directed fine sprays into the upper end of a tall chamber simultaneously with the continuous introduction of highly heated air under pressure into the lower part of said chamber, the heated air being at such temperature and in such volume that during its passage upwardly through the said chamber it will move into frictional contact with and retard the descent by gravity of the sprayed particles, and absorb and carry off the aqueous matter on its passage to and through the upper end of such chamber, allowing the solids in powdered or granular form to descend to the lower end of said chamber.

The preferred form of apparatus adapted for carrying out my invention comprises a vertical cylindrical chamber having about its lower portion perforated side walls and at its upper end a suitable outlet of somewhat restricted character for air, means about the lower portion of said cylinder for the delivery of highly heated air thereto through the perforations thereof, and means at the upper end of said cylinder for spraying the liquid or solution to be evaporated inwardly from the interior circumference to the center of said cylinder, the sprayed particles being left to descend by gravity and the heated air being caused to ascend through said cylinder under pressure, so that said air may carry off the aqueous matter and allow the solids to descend to the lower end of the cylinder. The vertical cylinder has upwardly converging walls to prevent the sprayed particles from gathering on and clinging to the same, and the lower perforated portion of said cylinder is surrounded by a hot air chamber into which the air is delivered under pressure and within which the said air may be heated by a steam coil, although it is to be understood that if preferred the air may be heated before being delivered to said hot air chamber, in which event the steam coil within said chamber may or may not be used as occasion may require.

The object of my invention is to provide a highly efficient apparatus whereby the evaporation of liquids, without injury to the solids contained therein, may be rapidly and economically accomplished.

The invention will be fully understood from the detailed description hereinafter presented, reference being had to the accompanying drawings, in which:—

Figure 2:
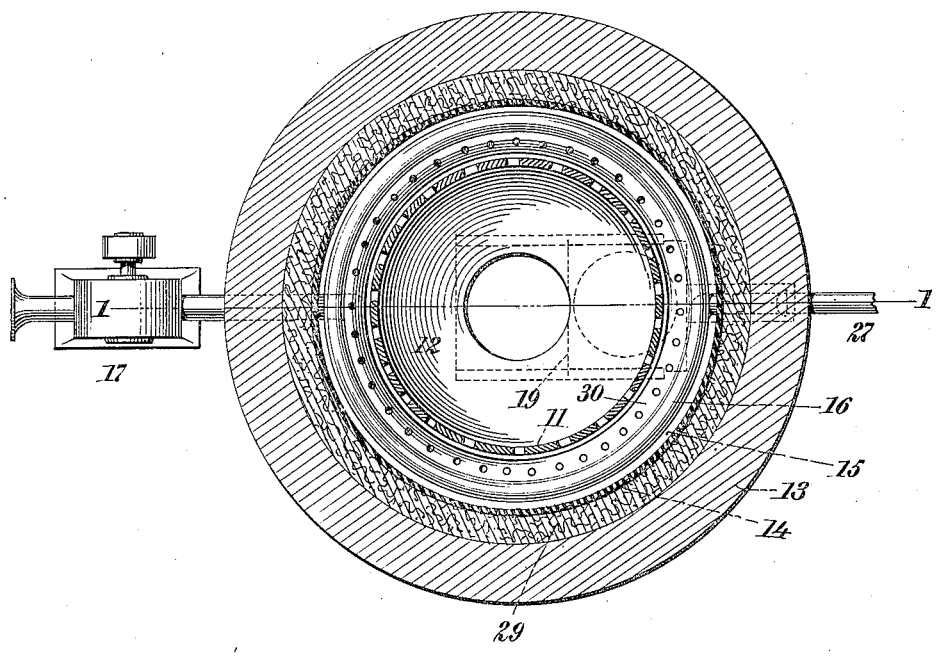

Figure 1 is a central vertical section through an apparatus constructed in accordance with and embodying my invention, and Fig. 2 is a horizontal section of same on the dotted line 2—2 of Fig. 1.

In the drawings 10 designates a suitable platform or floor upon which the apparatus is mounted, said apparatus comprising a vertical cylindrical shell 11 having a hopper shaped bottom 12, an exterior casing of masonry 13 inclosing said cylinder 11, the interior cylindrical shell of metal 14 surrounding the lower portions of said cylinder 11 but separated therefrom by a space 15 constituting a hot air chamber, the coil of pipe 16 for steam inclosed by said chamber 15, means such as a blower 17 for supplying air to said chamber 15, and a perforated pipe 18 encircling the upper end of said cylinder 11, into which pipe the material to be evaporated will be forced and which will spray the same upwardly and inwardly toward the vertical center of the cylinder 11, as shown in Fig. 1, whence the sprayed material will descend by gravity through said cylinder in opposition to the volume of hot air ascending through said cylinder, the result being that the volume of hot ascending air will move into frictional contact with the descending particles and absorb and carry off the aqueous matter and allow the solid particles originally in the liquid leaving the pipe 18 to descend into the hopper 12 in the form of a dry powder, which upon opening the gate valve 19 may be permitted to descend into a suitable receptacle 20 placed to receive the same.

The cylinder 11 will preferably be formed of sheet metal and its side walls converge toward the upper end of the cylinder, over which is placed a perforated plate 21 surmounted by a chimney 22 containing a damper 23 and provided with a cap 24, the latter being intended to prevent the descent of dust or other foreign matter into the chimney 22, and the damper 23 being provided to regulate the draft upwardly through the cylinder 11 and chimney 22. The purpose of having the side walls of the cylinder 11 converge upwardly is to prevent the sprayed substances to be evaporated from, during their descent, engaging and clinging to said walls, and also to insure the most efficient action of the volume of heated air ascending through said cylinder, the converging walls of said cylinder having the effect of crowding the air inwardly as it ascends and compelling the air in a consistent volume to pass into frictional contact with the matter descending and attempting to descend through it. Those portions of the walls of the cylinder 11 in line with the chamber 15 are perforated all over their surfaces, so that the heated air may freely enter the evaporating chamber and be compelled to thoroughly commingle with the descending matter.

The perforated pipe 18 extends circumferentially around the upper end of the cylinder 11, and is connected with a supply pipe 24 leading from the tank 25 into which the substance to be evaporated will be forced by means of an ordinary pump diagrammatically indicated at 26. The perforations in the pipe 18 are in line with openings in the cylinder 11, and the said perforations are on an upward inclination, so that the liquid leaving them may be sprayed upwardly and toward the center of the cylinder 11 as indicated in Fig. 1. It is of advantage that the pipe 18 be arranged at the upper end of the cylinder 11 and that said pipe encircle the cylinder and spray the liquid inwardly, because by reason thereof the materials sprayed are kept from contact, to the maximum degree, from any of the metal surfaces of the apparatus and are compelled to descend in opposition to and in frictional contact with the volume of highly heated air ascending through the cylinder 11.

The steam coil 16 is simply a non-perforated coil of pipe receiving the steam at the branch 27 and permitting its discharge at the branch 28, and said coil is within the chamber 15 and encircles that portion of the cylinder 11 which is perforated. The chamber 15 is surrounded by non-conductive packing 29, and this packing is extended upwardly around the upper portion of the cylinder 11.

Encircling the lower portion of the cylinder 11 is an air pipe 30 which may be kept hot by its contact with the coil 16 and is perforated along its upper edge so that the air escaping therefrom may be directed upwardly, as indicated by the arrows in Fig. 1, against the coil 16 and within the chamber 15, so that said air may become highly heated before it escapes into the cylinder 11. The pipe 30 is connected with the blower 17, which is of usual character and is employed simply for the purpose of delivering a proper volume of air to the air heating means, whence the highly heated air in constant volume is delivered to the cylinder 11 and compelled to move upwardly through said cylinder in frictional contact with the particles descending through the same. The pressure of the air delivered to the cylinder 11 is so regulated that the air will ascend through said cylinder in contact with and in opposition to the descending sprayed liquid and absorb the aqueous matter but will not carry with it the solids contained in said liquid, said solids being permitted to descend by gravity and being produced by the descent of the sprayed matter through the ascending body of air. The chamber 15 forms a hot air chamber and its outlet is only through the perforated walls of the cylinder 11 and thence through the perforated top of said cylinder.

The lower end of the cylinder 11 will preferably be within a closed room or chamber 31, which will have an inner door 32 and an outer door 33. I provide the two doors 32, 33 so that an employee when entering the room 31 to operate the valve 19 and receptacle 20 may first close the door 33 before opening the door 32 and thereby prevent any impure air or dust from being drawn upwardly into or about the cylinder 11 from without the room 31.

In the employment of the apparatus hereinbefore described the steam will be admitted to the coil 16 and the blower 17 set in motion, and after the interior of the cylinder 11 has become a hot-air chamber, due to the ascending volume of heated air, the liquid to be evaporated will be forced through the pipe 18 and sprayed inwardly, and thereafter the operation is continued automatically, the sprayed substance descending by gravity through the cylinder 11 and the volume of hot air ascending through said cylinder and in contact with the descending particles, the solids reaching the hopper 12 and the aqueous particles being absorbed and carried off by the hot air. The outlet at the upper end of the cylinder 11 and the blower 17 will be so regulated that a consistent body of hot air shall constantly ascend with sufficient force and at a proper temperature to carry off the aqueous particles and suitably resist the movement of the descending solids to insure the latter upon reaching the hopper 12 being in the form of a substantially dry powder.

While I do not limit the invention to the treatment of any special liquids, I contemplate its employment in the manufacture of milk powder, and in this manufacture my invention is of particular value in that the powder produced will be entirely soluble and retain the solids of the milk in a natural condition.

What I claim as my invention and desire to secure by Letters Patent, is:—

In apparatus for evaporating liquids, the vertical shell forming an evaporating chamber and having an outlet at its upper end, and means for spraying the liquid into the upper end of said chamber, the lower walls of said chamber being perforated and surrounded by a hot air chamber, combined with the steam coil in said hot-air chamber, the perforated air pipe in the lower end of said chamber, and means for forcing the air into and out through the perforations of said air-pipe and causing the hot air in said hot air chamber to pass through said perforated walls and ascend in contact with the descending sprayed liquid, whereby said air is enabled to absorb and carry off the aqueous matter and the solids contained in the liquid are permitted to descend to the lower end of said evaporating chamber; substantially as set forth.

Signed at New York, in the county of New York, and State of New York, this 7th day of April A. D. 1904.

JACOB LOUIS SCHRADE.

Witnesses:
   CHAS. C. GILL,
   ARTHUR MARION.